(12) United States Patent
Kim et al.

(10) Patent No.: US 8,471,525 B2
(45) Date of Patent: Jun. 25, 2013

(54) APPARATUS AND METHOD FOR CHARGING INTERNAL BATTERY IN WIRELESS SENSOR NETWORK

(75) Inventors: Se Han Kim, Daejeon (KR); Nae Soo Kim, Daejeon (KR); Ho Yong Kang, Daejeon (KR); Kyo Hoon Son, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 353 days.

(21) Appl. No.: 12/885,872

(22) Filed: Sep. 20, 2010

(65) Prior Publication Data

US 2011/0148349 A1    Jun. 23, 2011

(30) Foreign Application Priority Data

Dec. 17, 2009    (KR) .................. 10-2009-0125926

(51) Int. Cl.
  *H02J 7/00*    (2006.01)
(52) U.S. Cl.
  USPC ........................................ 320/108; 320/106
(58) Field of Classification Search
  USPC ................................. 320/108, 106
  See application file for complete search history.

(56) References Cited

U.S. PATENT DOCUMENTS

| 7,065,658 | B1 * | 6/2006 | Baraban et al. | ............... 713/300 |
| 7,791,311 | B2 * | 9/2010 | Sagoo | ............... 320/108 |
| 2006/0076934 | A1 | 4/2006 | Ogata et al. | |

FOREIGN PATENT DOCUMENTS

| JP | 2007-181278 | 7/2007 |
| KR | 20-2007-0001178 | 11/2007 |
| KR | 10-2008-0091924 | 10/2008 |
| KR | 10-2009-0016110 | 2/2009 |

* cited by examiner

*Primary Examiner* — Samuel Berhanu
(74) *Attorney, Agent, or Firm* — Staas & Halsey LLP

(57) ABSTRACT

Provided are an apparatus and method for charging an internal battery in a wireless sensor network. A method for a slave sensor node to charge an internal battery in a sensor network includes estimating an hourly chargeable electric energy rate in a scan phase with a master sensor node, transmitting the estimated hourly chargeable electric energy rate using an association request message requesting association with the master sensor node after recognizing the master sensor node, requesting charging from the master sensor node and performing wireless charging when a power level of an internal battery requires charging, reporting the power level of the internal battery varied by the wireless charging to the master sensor node by predetermined time periods during the wireless charging, and stopping the wireless charging when the power level reported to the master sensor node reaches a predetermined power level.

14 Claims, 8 Drawing Sheets

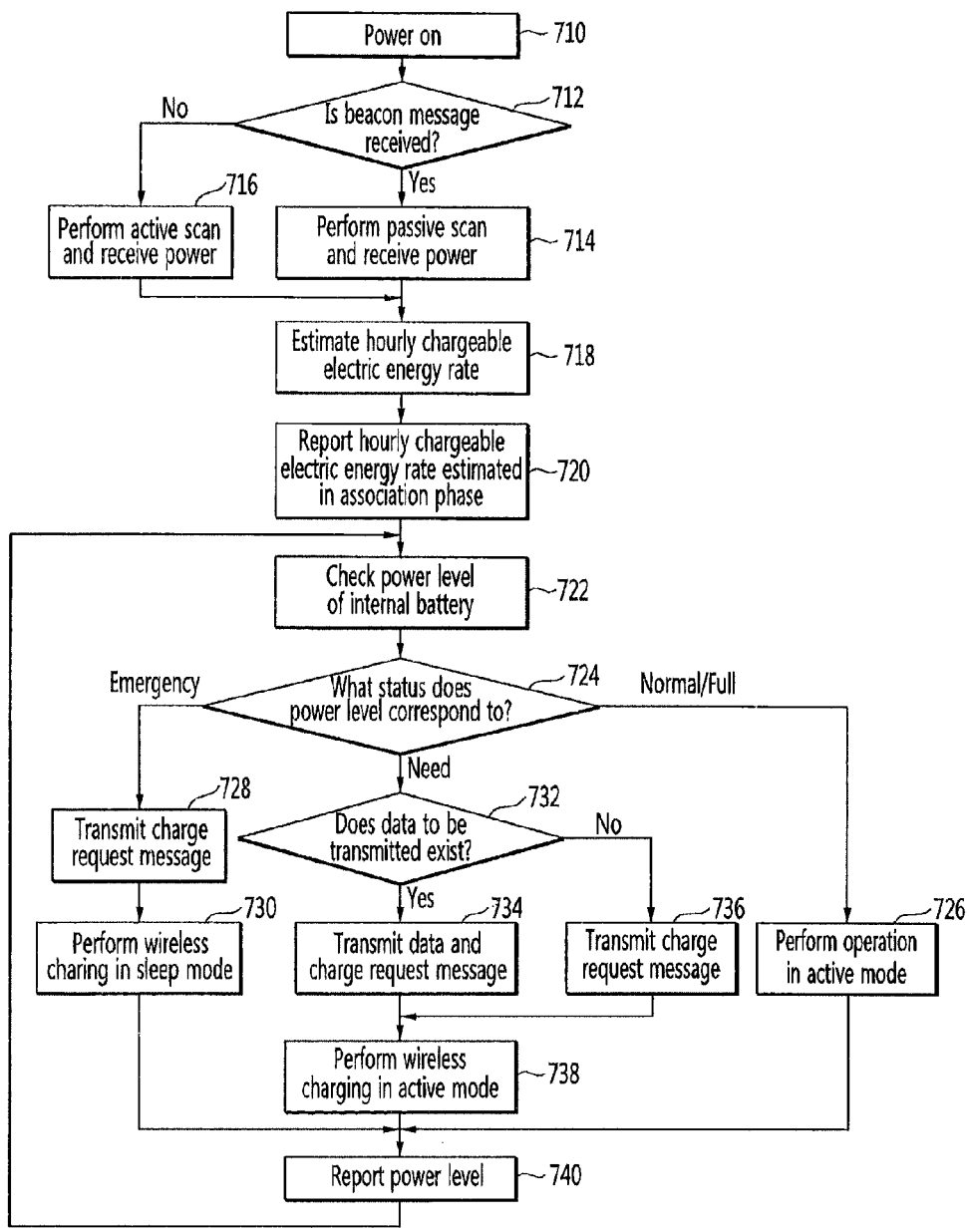

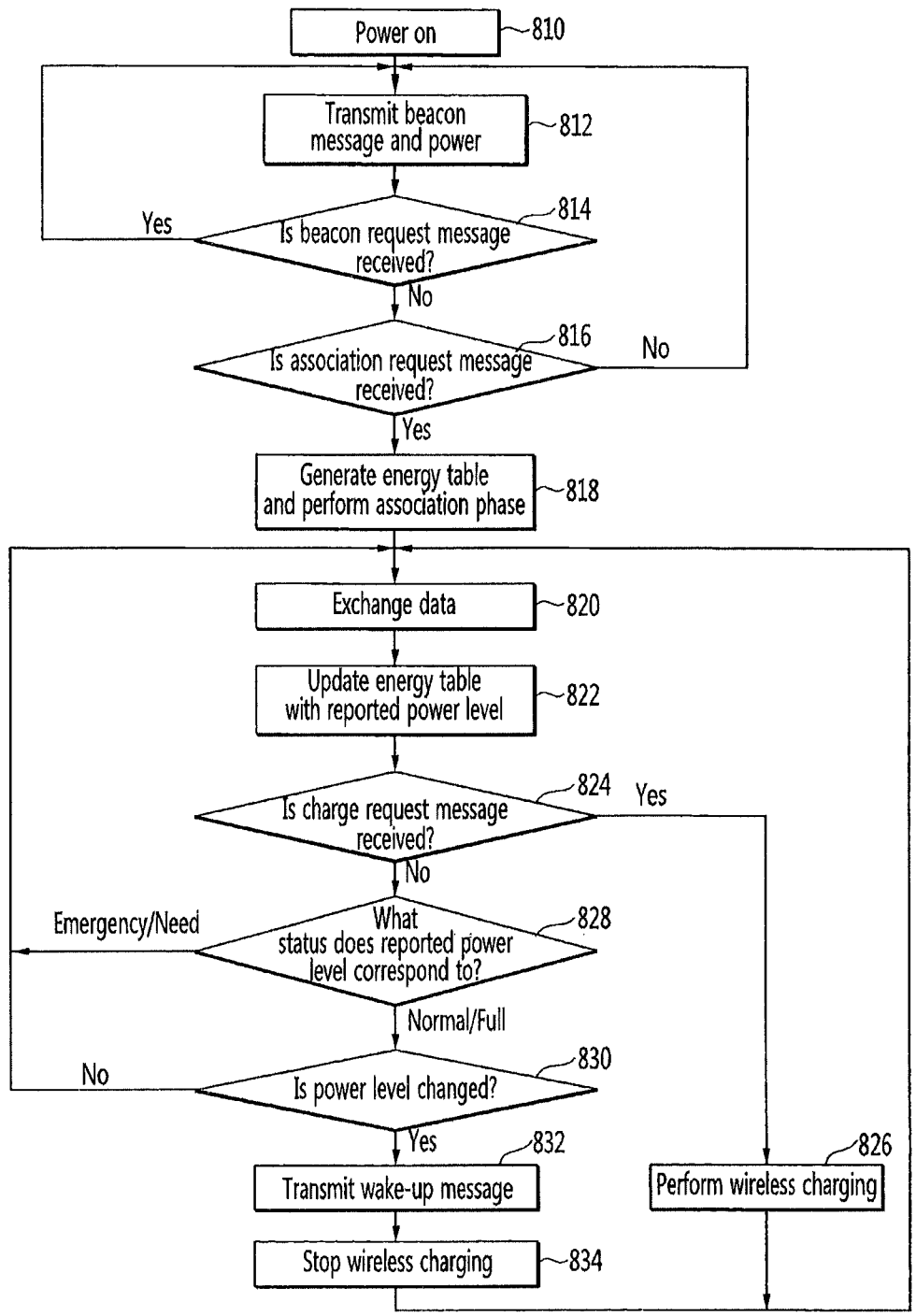

FIG. 9

Energy Table

| Slave Node Address (8bit) | Energy Level (3bit) | Status (2bit) | 1st Charge (1bit) | Reserved (2bit) | Charge Power/Sec (8bit) |
|---|---|---|---|---|---|
| | | | | | |

FIG. 10

| Octets:2 | 1 | 4/10 | 0/5/6/10/14 | 2 | variable | variable | variable | 2 |
|---|---|---|---|---|---|---|---|---|
| Frame Control | Sequence Number | Addressing fields | Auxiliary Security Header | Sequence Specification | GTS fields (Figure 45) | Pending address fields (Figure 46) | Beacon Payload | FCS |
| MHR | | | | MAC Payload | | | | MFR |

FIG. 11

| Octets:(see 7.2.2.4) | 1 | 1 |
|---|---|---|
| MHR fields | Command Frame Identifier (see Table 82) | Capability Information |

FIG. 12

| Command Frame Identifier | Command name |
| --- | --- |
| 0x01 | Association request |
| 0x02 | Association response |
| 0x03 | Disassociation notification |
| 0x04 | Data request |
| 0x05 | PAN PID conflict notification |
| 0x06 | Orphan notification |
| 0x07 | Beacon request |
| 0x08 | Coordination realignment |
| 0x09 | GTS request |
| 0x0a-0xff | Reserved |

FIG. 13

| bits : 0 | 1 | 2 | 3 | 4-5 | 6 | 7 |
| --- | --- | --- | --- | --- | --- | --- |
| Alternate PAN Coordinator | Device Type | Power Source | Receiver On When Idle | Reserved | Security Capability | Allocate Address |

APPARATUS AND METHOD FOR CHARGING INTERNAL BATTERY IN WIRELESS SENSOR NETWORK

CROSS-REFERENCE TO RELATED APPLICATION

This application claims priority to and the benefit of Korean Patent Application No. 10-2009-0125926, filed Dec. 17, 2009, the disclosure of which is incorporated herein by reference in its entirety.

BACKGROUND

1. Field of the Invention

The present invention relates to an apparatus and method for charging an internal battery in a wireless sensor network, and more particularly to an apparatus and method for charging an internal battery over a wireless channel between wireless sensor nodes.

2. Discussion of Related Art

In general, wireless sensor networks used in a wide range of application fields such as event/target sensing, monitoring, and tracking. In these application fields, numerous sensor nodes are densely disposed, and thus wireless sensor networks need to be intentionally designed. In other words, the management area of each sensor node should be guaranteed by ad-hoc networking.

In particular, a ubiquitous sensor network (USN) denotes a network system that organizes a wireless sensor network using sensor nodes having a sensor capable of obtaining recognition information about an object or environmental information about surroundings, and processes and manages information input through the various sensor nodes in real time in communication with the outside over the network.

In general, sensor nodes constituting such a sensor network are disposed at locations where it is impossible to receive operating power from the outside. Thus, in most cases, the sensor nodes can no longer be used when their battery life ends after the sensor nodes have been in a network, or are used in a self-charging method such as solar cell and vibration.

For these reasons, it is necessary to supply power to sensor nodes constituting a sensor network from the outside while minimizing their power consumption.

SUMMARY OF THE INVENTION

The present invention is directed to an apparatus and method for charging the battery of a sensor node in a sensor network and minimizing power consumption dependent on operation of the sensor node.

One aspect of the present invention provides a method for at least one slave sensor node to charge an internal battery in a sensor network including a master sensor node and the at least one slave sensor node associated with the master sensor node, the method including: estimating an hourly chargeable electric energy rate in a scan phase with the master sensor node; after recognizing the master sensor node, transmitting the estimated hourly chargeable electric energy rate using an association request message requesting association with the master sensor node; when a power level of an internal battery requires charging, requesting charging from the master sensor node and performing wireless charging; during the wireless charging, reporting the power level of the internal battery varied by the wireless charging to the master sensor node by predetermined time periods; and when the power level reported to the master sensor node reaches a predetermined power level, stopping the wireless charging.

The power level of the internal battery may be classified as a full status, a normal status, a need status, or an emergency status, and when the power level of the internal battery corresponds to the need status or the emergency status, it may be determined that charging is needed.

The predetermined power level may correspond to one of the full status and the normal status.

When the power level of the internal battery corresponds to the need status, the wireless charging may be performed during data communication with the master sensor node, and when the power level of the internal battery corresponds to the emergency status, the wireless charging may be performed in a standby mode consuming a minimum power.

Another aspect of the present invention provides a method for a master sensor node to charge an internal battery of at least one slave sensor node in a sensor network including the master sensor node and the at least one slave sensor node associated with the master sensor node, the method including: after recognizing at least one slave sensor node in a scan phase, receiving an association request message including an estimated hourly chargeable electric energy rate from the slave sensor node; generating an energy table on the basis of the hourly chargeable electric energy rate reported from the slave sensor node; when a charge request is received from the slave sensor node, performing wireless charging on the slave sensor node on the basis of the generated energy table; receiving a power level of an internal battery varied by the wireless charging from the slave sensor node on which the wireless charging is performed by predetermined time periods, and updating the energy table; and when it is determined that the power level reported from the slave sensor node on which the wireless charging is performed reaches a predetermined power level, stopping the wireless charging.

The power level of the internal battery may be classified as a full status, a normal status, a need status, or an emergency status, and when the power level of the internal battery corresponds to the need status or the emergency status, charging may be requested.

The predetermined power level may correspond to one of the full status and the normal status.

Still another aspect of the present invention provides a slave sensor node charging an internal battery in a sensor network including a master sensor node and at least one slave sensor node associated with the master sensor node, the slave sensor node including: a wireless charging receiving module for estimating an hourly chargeable electric energy rate in a scan phase with the master sensor node, and performing wireless charging by the master sensor node when a power level of the internal battery requires charging; and a transceiver for transmitting the estimated hourly chargeable electric energy rate using an association request message requesting association with the master sensor node after recognizing the master sensor node, requesting charging from the master sensor node when the power level of the internal battery requires charging, reporting the power level of the internal battery varied by the wireless charging to the master sensor node by predetermined time periods during the wireless charging, and stopping the wireless charging when the varied power level reaches a predetermined power level.

The power level of the internal battery may be classified as a full status, a normal status, a need status, or an emergency status, and when the power level of the internal battery corresponds to the need status or the emergency status, it may be determined that charging is needed.

The predetermined power level may correspond to one of the full status and the normal status.

When the power level of the internal battery corresponds to the need status, the wireless charging may be performed during data communication with the master sensor node, and when the power level of the internal battery corresponds to the emergency status, the wireless charging may be performed in a standby mode consuming a minimum power.

Yet another aspect of the present invention provides a master sensor node for charging an internal battery of at least one slave sensor node associated with the master sensor node in a sensor network including the master sensor node and the at least one slave sensor node, the master sensor node including: a controller for receiving an association request message including an estimated hourly chargeable electric energy rate from at least one slave sensor node after recognizing the slave sensor node in a scan phase, generating an energy table on the basis of an hourly chargeable electric energy rate reported from the slave sensor node, receiving a power level of an internal battery varied by wireless charging from the slave sensor node on which the wireless charging is performed by predetermined time periods to update the energy table; a wireless charging transmitting module for supplying power for wireless charging of the slave sensor node on the basis of the generated energy table in response to each of the scan phase, data transmission to the slave sensor node, and reception of a charge request from the slave sensor node; and a wake-up radio frequency (RF) unit for transmitting an activation request message to the slave sensor node on which the wireless charging is performed when it is determined that the power level reported from the slave sensor node on which the wireless charging is performed reaches a predetermined power level.

The power level of the internal battery may be classified as a full status, a normal status, a need status, or an emergency status, and when the power level of the internal battery corresponds to the need status or the emergency status, the charge request may be received.

The predetermined power level may correspond to one of the full status and the normal status.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which:

FIG. 7 illustrates a control flow for a slave sensor node to wirelessly charge an internal battery in a sensor network according to an exemplary embodiment of the present invention;

FIG. 8 illustrates a control flow for a master sensor node to charge an internal battery of a slave sensor node in a sensor network according to an exemplary embodiment of the present invention;

FIG. 9 shows an example of an energy table managed by a master sensor node according to an exemplary embodiment of the present invention; and FIGS. 10 to 13 show tables in which messages transmitted between a master sensor node and a slave sensor node for wireless charging are defined according to exemplary embodiments of the present invention.

DETAILED DESCRIPTION OF EXEMPLARY EMBODIMENTS

Figure 1:
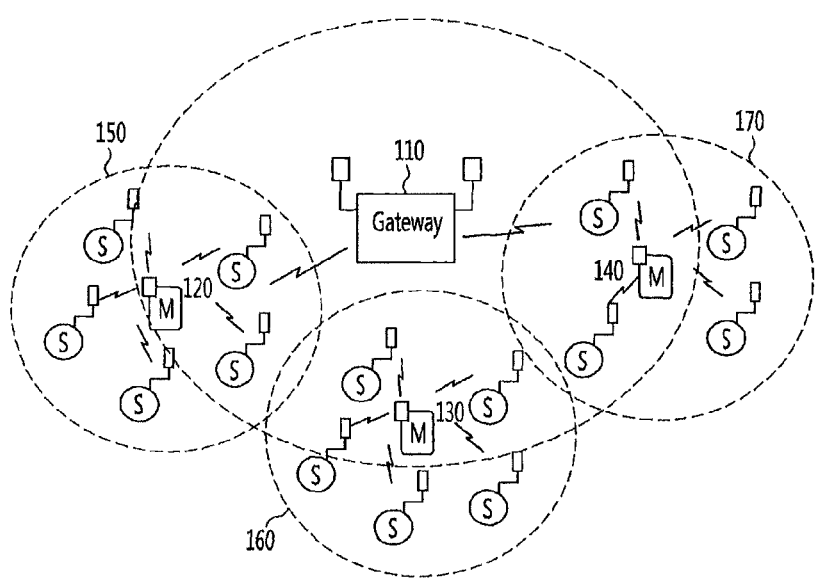
FIG. 1 shows the structure of a sensor network according to an exemplary embodiment of the present invention.

Hereinafter, exemplary embodiments of the present invention will be described in detail. However, the present invention is not limited to the embodiments disclosed below but can be implemented in various forms. The following embodiments are described in order to enable those of ordinary skill in the art to embody and practice the present invention. To clearly describe the present invention, parts not relating to the description are omitted from the drawings. Like numerals refer to like elements throughout the description of the drawings.

Throughout this specification, when an element is referred to as being "connected" or "coupled" to another element, it can be directly connected or coupled to the other element or electrically connected or coupled to the other element with yet another element interposed between them.

Throughout this specification, when an element is referred to as "comprises," "includes," or "has" a component, it does not preclude another component but may further include the other component unless the context clearly indicates otherwise. Also, as used herein, the terms " . . . unit," " . . . device," " . . . module," etc., denote a unit of processing at least one function or operation, and may be implemented as hardware, software, or combination of hardware and software.

The present invention suggests a method of administering a sensor network employing a wireless charging technique in consideration of a characteristic that a chargeable electric energy decreases as a distance for wireless charging increases. To this end, statuses of a battery of a slave sensor node are classified into four phases, so that a master sensor node can wirelessly charge the battery as occasion demands. At this time, wireless charging efficiency is maximized, and existing compatibility with Zigbee and institute of electrical and electronics engineers (IEEE) 802.15.4 is maintained as high as possible.

Also, even when a new protocol suggested in the present invention is used, characteristics of a sensor network are maintained as they are. To this end, a message process for communication between a master sensor node and a slave sensor node and a charging process will be described in detail. Furthermore, the present invention allows a sensor network to be administered for a long time, so that various indoor and outdoor applications can be applied.

First, terminologies that will be used in the detailed description according to exemplary embodiments of the present invention are defined below.

Master Sensor Node: this is one sensor node in a wireless sensor network that supplies power for data exchange with a slave sensor node within a predetermined service area and wireless charging of the slave sensor node.

Slave Sensor Node: this is one sensor node in a wireless sensor network whose internal battery is charged by data exchange with a specific master sensor node and power supplied by the specific master sensor node.

Scan Phase: this is a phase in which a process of a master sensor node and a slave sensor node recognizing each other is performed.

Association Phase: this is a phase in which a process of associating a master sensor node recognized by a slave sensor node with the slave sensor node recognized by the master sensor node is performed.

Data Exchanging and Charging Phase: this is a phase in which a process of exchanging data between a master sensor node and a slave sensor node associated with each other, and charging a battery of the slave sensor node with power supplied by the master sensor node is performed.

Sleep Mode: this is an operation status which consumes the minimum power to perform only a function of being woken up by external interruption, used when the battery charge status of a sensor node is an emergency status requiring immediate charging.

Active Mode: this is an operation status used by a sensor node when the battery charge status of the sensor node enables a normal operation.

Meanwhile, in exemplary embodiments of the present invention to be described below, statuses of a battery of a sensor node are classified into a full status, a normal status, a need status, and an emergency status, so that the battery of a sensor node in the need status or the emergency status can be wirelessly charged.

To this end, a sensor node estimates an amount of electric energy that can be charged per hour (referred to as an hourly chargeable electric energy rate) with power supplied by a superordinate sensor node in the scan phase, and transfers the estimated value to the superordinate sensor node. Also, the sensor node periodically checks and reports its own battery status to the superordinate sensor node.

The superordinate sensor node generates and manages an energy table using information of an hourly chargeable electric energy rate and a battery status reported by at least one sensor node within its service area.

Also, the superordinate sensor node exchanges data with sensor nodes associated with the superordinate sensor node itself, and supplies power for wireless charging of a sensor node that is determined to be in need of charging on the basis of information managed in the energy table.

To be specific, when the battery charge status of a sensor node is the emergency status, the sensor node switches to the sleep mode consuming the minimum power and then requests charging. The battery of the sensor node is charged with power wirelessly supplied from a superordinate sensor node in response to the charge request. When the battery is charged to the normal status or the full status, or the sensor node is interrupted by the superordinate sensor node to wake up for the same reason, the sensor node stops charging and switches to the active mode.

On the other hand, when the battery charge status of the sensor node is the need status and there is data to be transmitted, the sensor node transmits a charge request message to the superordinate sensor node together with the data. When there is no data to be transmitted, the sensor node transmits the charge request message alone to the superordinate sensor node. And, the battery is charged with power wirelessly supplied from the superordinate sensor node in response to the charge request message. When the battery is charged to the normal status or the full status, or the sensor node is interrupted by the superordinate sensor node to wake up for the same reason, the sensor node stops charging and switches to the active mode.

Exemplary embodiments of the present invention will be described in detail below with reference to the attached drawings.

FIG. 1 shows the structure of a sensor network according to an exemplary embodiment of the present invention.

Referring to FIG. 1, a gateway 110 is an uppermost master sensor node representing the constitution of a sensor network. The gateway 110 manages use of wireless resources of the sensor network and interoperates with an external network.

Master sensor nodes 120, 130 and 140 collect sensing information from subordinate sensor nodes, and route the collected sensing information to the gateway 110. Also, the master sensor nodes 120, 130 and 140 can supply power to subordinate sensor nodes as master sensor nodes and also can be charged with power supplied from the gateway 110. Needless to say, the master sensor nodes 120, 130 and 140 can be implemented only to supply power to subordinate sensor nodes for wireless charging.

The gateway 110 and the respective master sensor nodes 120, 130 and 140 have service areas 150, 160 and 170 corresponding to a physical electric wave propagation distance. The service areas 150, 160 and 170 are indicated by dotted lines, and subordinate sensor nodes within the service areas 150, 160 and 170 transfer sensing information to the gateway 110 and the master sensor nodes 120, 130 and 140 having the corresponding service areas. The subordinate sensor nodes charge internal batteries with power supplied from the master sensor nodes 120, 130 and 140.

The subordinate sensor nodes use the minimum power in an inactive or sleep period, and are activated by an external interrupt signal in the inactive period. When interruption is caused by reception of a wake-up radio frequency (RF) or a power level measuring module of a battery, an inactive status is switched to an active status.

Figure 2:
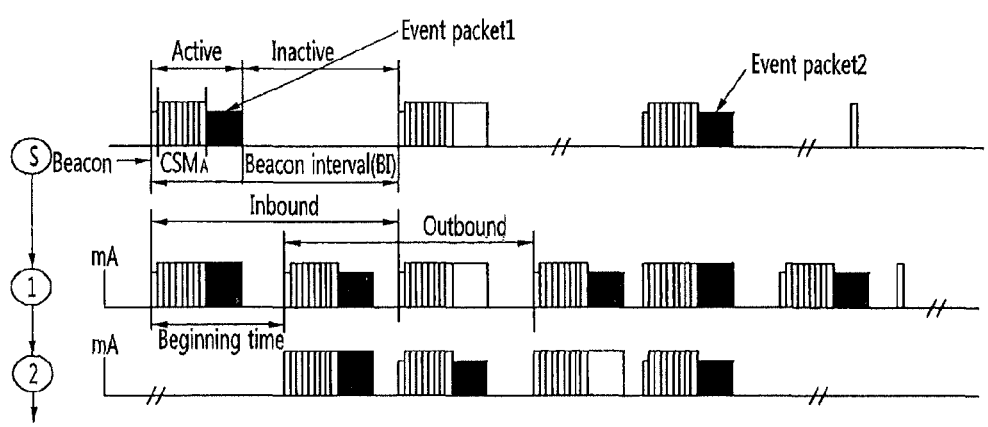
FIG. 2 shows active/inactive periods managed for low power consumption at a sensor node in a sensor network.

FIG. 2 shows active/inactive periods managed for low power consumption at a sensor node in a sensor network.

Referring to FIG. 2, during the inactive period in which power is not used to minimize power consumption of respective sensor nodes, power consumption of the sensor nodes is minimized. Only in the active period is power used to perform communication.

Thus, a media access control (MAC) protocol is configured to minimize the total power consumption of a sensor network. To this end, the configuration of the active/inactive periods (design of wireless resources) is set by a first coordinator and transmitted to child nodes belonging to each coordinator by periodic beacon packet transmission of the first coordinator and other coordinators. At this time, the child nodes operate in synchronization with wireless active/inactive periods indicated by the beacon message. Network use based on periodic transmission of such a beacon message should always maintain active/inactive periods.

As described above, a method of configuring a wireless sensor network employs active/inactive periods to minimize power consumption.

Figure 3:
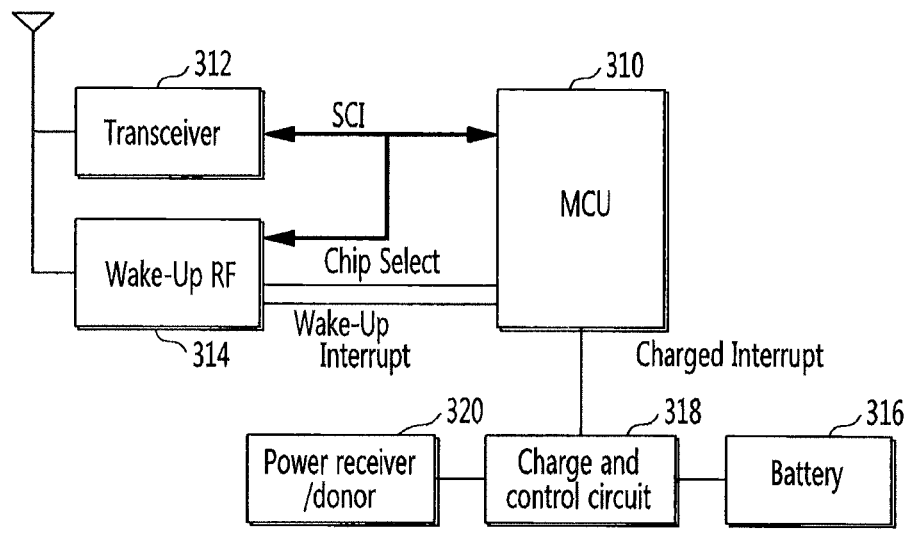
FIG. 3 is a block diagram showing the configuration of a slave sensor node according to an exemplary embodiment of the present invention.

FIG. 3 is a block diagram showing the constitution of a slave sensor node according to an exemplary embodiment of the present invention.

Referring to FIG. 3, a slave sensor node includes a micro controller unit (MCU) 310 in which operating software is installed, a main transceiver 312 for exchanging data, a wake-up RF 314 that operates with low power and can exchange only simple information, an internal battery 316 that can be charged, a power receiver/donor 320 capable of wireless power transmission and reception, a charge and control circuit 318, and other modules such as an antenna, a case, and a sensor.

A gateway constituting a sensor network can use Normal Power Source instead of an internal battery, and only include a power donor without a power receiver. While a master sensor node can supply and receive power or only supply power, a slave sensor node wirelessly receives power.

In an inactive period, a sensor node is activated by an external interrupt signal to use the minimum power. When the sensor node is interrupted by receiving a wake-up RF or a power level measuring module of a battery, the inactive status is switched to the active status.

All the components shown in the drawing can be implemented in at least one chip.

Figure 4:
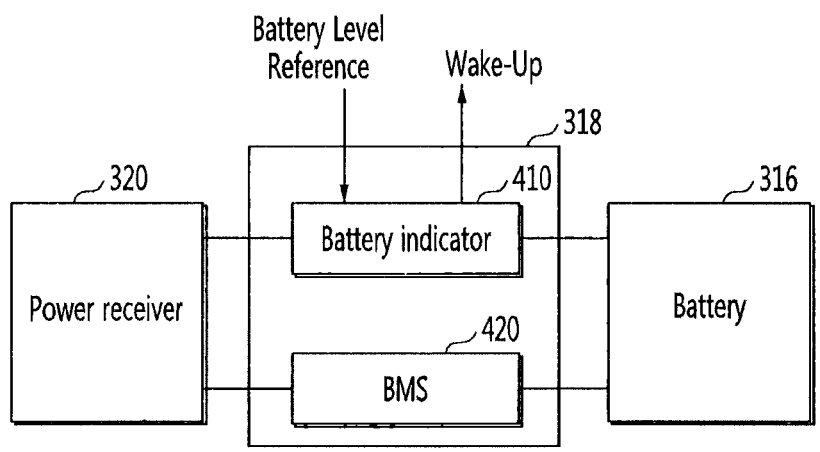
FIG. 4 is a block diagram showing a detail configuration of a charge and control circuit of the slave sensor node according to an exemplary embodiment of the present invention.

FIG. 4 is a block diagram showing a detail configuration of a charge and control circuit of the slave sensor node according to an exemplary embodiment of the present invention. Referring to FIG. 4, an internal battery 316 is a secondary battery, such as a lithium ion or lithium polymer battery, that can be reused by charging. The internal battery 316 is charged with power supplied from a master sensor node.

A battery management system (BMS) 420 controls operation for protecting and charging the internal battery 316 to charge the internal battery 316, maintain the minimum power, and so on. A battery indicator 410 estimates an hourly chargeable electric energy rate at the slave sensor node in consideration of a characteristic that a chargeable electric energy rate decreases as a wireless charging distance increases, and measures the capacity of the internal battery 316. Also, when the charge level of the internal battery 316 exceeds a predetermined value, the battery indicator 410 generates a wake-up interrupt for waking up the slave sensor node.

Figure 5:
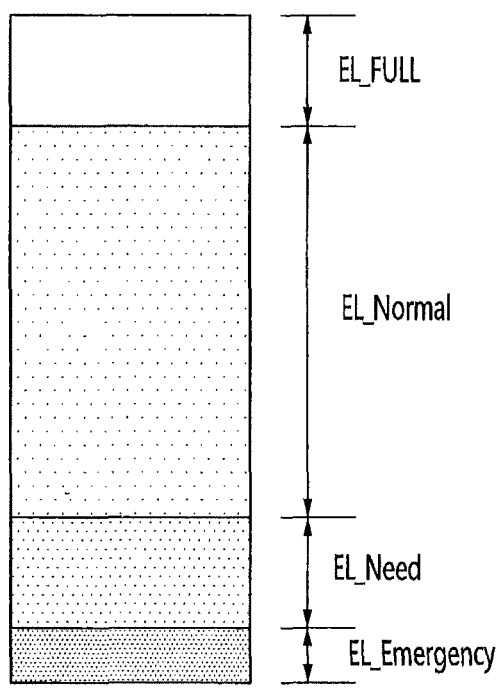
FIG. 5 shows power statuses of an internal battery in a slave sensor node according to an exemplary embodiment of the present invention.

FIG. 5 shows power statuses of an internal battery in a slave sensor node according to an exemplary embodiment of the present invention.

Referring to FIG. 5, power statuses of an internal battery in a slave sensor node can be classified into four phases, that is, the full status, the normal status, the need status, and the emergency status.

The full status denotes that the internal battery has been completely charged, and the normal status denotes that the internal battery has been charged as much as the slave sensor node can normally operate. The need status denotes that the slave sensor node can perform a basic operation but the internal battery needs to be charged, and the emergency status denotes that the internal battery needs to be charged immediately.

Thus, in an exemplary embodiment of the present invention, the internal battery is charged with power supplied from a master sensor node when the power level of the internal battery in the slave sensor node corresponds to the need status or the emergency status. Also, when the power level of the internal battery in the slave sensor node is switched to the full status or the normal status, wireless charging is stopped.

Figure 6:
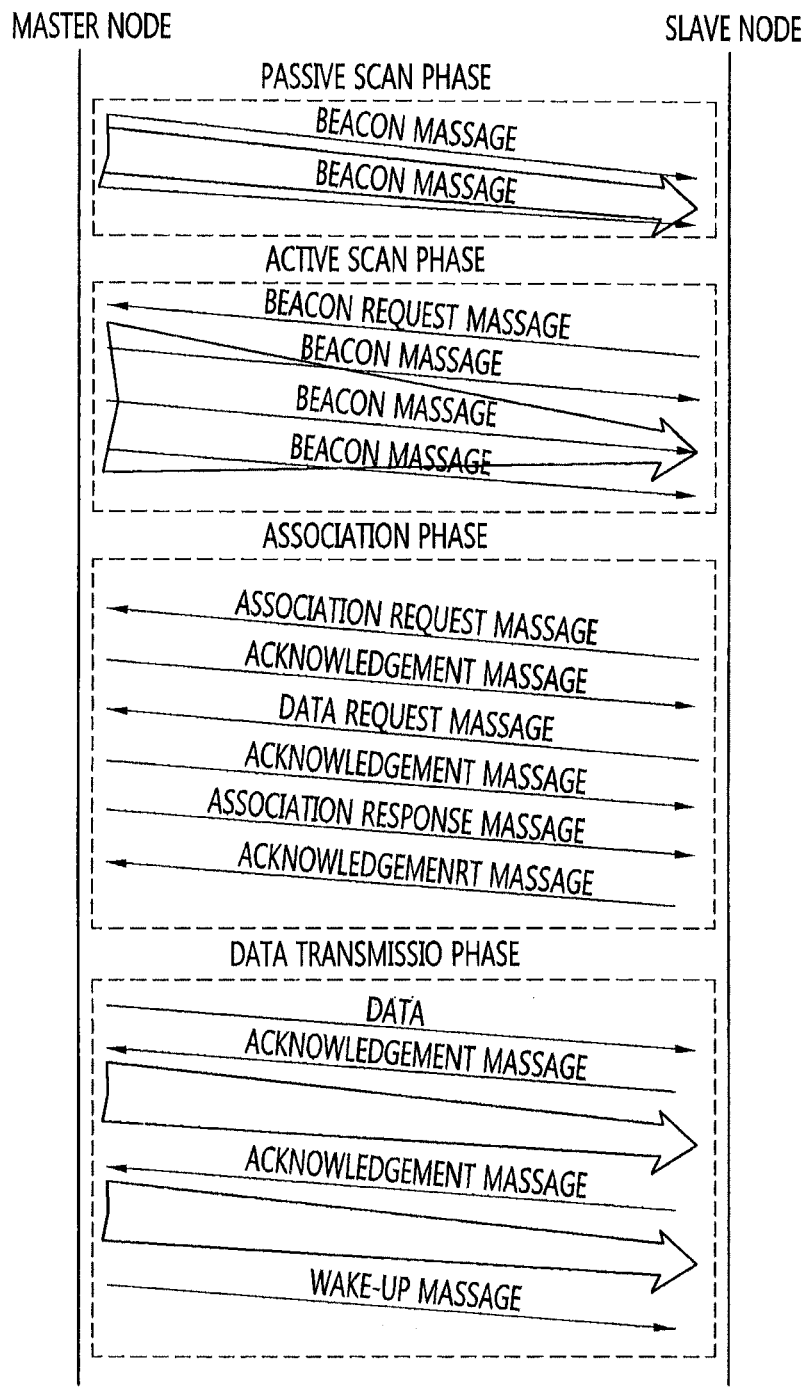
FIG. 6 illustrates signaling between a master sensor node and a slave sensor node according to an exemplary embodiment of the present invention.

FIG. 6 illustrates signaling between a master sensor node and a slave sensor node according to an exemplary embodiment of the present invention. Here, it is assumed that the master sensor node includes a main transceiver, a wake-up RF unit, and a wireless charging transmitting module, and the slave sensor node includes a main transceiver, a wake-up RF unit, and a wireless charging receiving module.

Referring to FIG. 6, signaling between the master sensor node and the slave sensor node can be classified into the scan phase, the association phase, and the data exchanging and charging phase.

In the scan phase, signaling for the master sensor node to recognize the slave sensor node and for the slave sensor node to recognize the master sensor node is performed. The scan phase is classified as a passive scan process or an active scan process. In the passive scan process, the master sensor node is recognized by a beacon message periodically transmitted by the master sensor node, and in the active scan process, the master sensor node is recognized by a beacon message that is transmitted by the master sensor node in response to a request from the slave sensor node.

Meanwhile, in an exemplary embodiment of the present invention, the master sensor node controls the wireless charging transmitting module to transmit power for wireless charging when the beacon message is transmitted by the main transceiver. Thus, the wireless charging receiving module of the slave sensor node estimates an hourly chargeable electric energy rate using the power transmitted by the wireless charging transmitting module of the master sensor node.

After recognizing the master sensor node in the scan phase, the slave measures the power level of its internal battery. This is intended to report the power level when the slave sensor node requests the recognized master sensor node to associate with the slave sensor.

In the association phase, signaling for association between the master sensor node and the slave sensor node mutually recognized in the scan phase is performed.

In other words, when the slave sensor node and the master sensor node recognize each other, the association phase is performed by request of the main transceiver of the slave sensor node. To be specific, when the main transceiver of the slave sensor node transmits an association request message to the main transceiver of the master sensor node, the main transceiver of the master sensor node transmits an acknowledgement message to the main transceiver of the slave sensor node in response to the association request message. At this time, the main transceiver of the slave sensor node includes the previously estimated hourly chargeable electric energy rate in the association request message and transmits the association request message. Also, the main transceiver of the slave sensor node may transmit the association request message with the power level of the internal battery at the corresponding point in time included in the association request message.

When the acknowledgment message is received from the main transceiver of the master sensor node, the main transceiver of the slave sensor node transmits a data request message, and the main transceiver of the master sensor node transmits an association response message together with an acknowledgement message to the main transceiver of the slave sensor node in response to the data request message. The main transceiver of the slave sensor node receiving the association response message transmits an acknowledgement message to the main transceiver of the master sensor node in response to the association response message.

Finally, in the data exchanging and charging phase, signaling for data transmission between the main transceiver of the master sensor node and the main transceiver of the slave sensor node or wireless charging between the wireless charging transmitting module of the master sensor node and the wireless charging receiving module of the slave sensor node is performed.

To be specific, when the master sensor node and the slave sensor node associate with each other, the main transceiver of the master sensor node transmits data to the main transceiver of the slave sensor node, and the main transceiver of the slave sensor node transmits an acknowledgment message to the main transceiver of the master sensor node in response to the data. At this time, the wireless charging transmitting module of the master sensor node supplies power for wireless charging to the wireless charging receiving module of the slave sensor node.

When the main transceiver of the master sensor node receives a charge request from the main transceiver of the slave sensor node, the wireless charging transmitting module of the master sensor node supplies power for wireless charging to the wireless charging receiving module of the slave sensor node.

When the power level of the internal battery in the slave sensor node increases as much as desired by wireless charging, the wake-up RF unit of the master sensor node transmits a wake-up message to the wake-up RF unit of the slave sensor node. The slave sensor node receiving the wake-up message resumes data transmission through the main transceiver, and the main transceiver of the master sensor node transmits an acknowledgment message to the main transceiver of the slave sensor node in response to transmitted data.

FIG. 7 illustrates a control flow for a slave sensor node to wirelessly charge an internal battery in a sensor network according to an exemplary embodiment of the present invention.

Referring to FIG. 7, when a slave sensor node is powered on in operation 710, the slave sensor node determines whether a beacon message is received from a master sensor node in operation 712. The beacon message includes a wireless resource use plan, that is, the definition of active/inactive periods and information on the master sensor node.

When the beacon message is received from the master sensor node, the slave sensor node recognizes the master, sensor node through a passive scan process in operation 714. The passive scan process performed to recognize the master sensor node has already been described above, and the detailed description will not be reiterated. During the passive scan process, the slave sensor node receives power for wireless charging from the master sensor node.

On the other hand, when the beacon message is not received from the master sensor node, the slave sensor node recognizes the master sensor node through an active scan process in operation 716. The active scan process performed to recognize the master sensor node has already been described above, and the detailed description will not be reiterated. During the active scan process, the slave sensor node receives power for wireless charging from the master sensor node.

After recognizing the master sensor node through the active scan process or the passive scan process, the slave sensor node estimates an hourly chargeable electric energy rate in operation 718. In other words, the slave sensor node measures chargeable electric energy using the power received from the master sensor node during the passive scan process or the active scan process. At this time, the slave sensor node takes the characteristic that chargeable electric energy decreases in proportion to a distance between the nodes into consideration. Using the measured chargeable electric energy, it is possible to estimate the hourly chargeable electric energy rate.

Meanwhile, when the master sensor node is recognized as described above, the slave sensor node performs an association phase. In other words, the slave sensor node performs a process for associating with the previously recognized master sensor node. At this time, the slave sensor node reports the estimated hourly chargeable electric energy rate to the master sensor node in operation 720. As an example in which the slave sensor node reports the estimated hourly chargeable electric energy rate, the slave sensor node can include the estimated hourly chargeable electric energy rate in an association request message transmitted for association with the master sensor node.

When the slave sensor node is associated with the master sensor node, the slave sensor node checks the power level of the internal battery in operation 722. As mentioned above, the power level of an internal battery can be classified as the full status, the normal status, the need status, or the emergency status. In an exemplary embodiment of the present invention, it is assumed that the full status and the normal status correspond to a power level that does not require charging, and the need status and the emergency status correspond to a power level that requires charging.

When checking the power level of the internal battery is finished, the slave sensor node determines a status corresponding to the power level in operation 724. In other words, the slave sensor node determines an operation to perform according to the checked power level. Referring to FIG. 7, the slave sensor node performs operation 728 when it is determined that the power level of the internal battery corresponds to the emergency status, and operation 732 when it is determined that the power level of the internal battery corresponds to the need status.

On the other hand, when it is determined that the power level corresponds to the full status or the normal status, the slave sensor node performs operation 726. In operation 726, the slave sensor node determines that the internal battery does not need to be charged, and performs general operation in the active mode. The slave sensor node reports the previously checked power level of the internal battery to the master sensor node.

In operation 728, the slave sensor node transmits a charge request message for requesting wireless charging from the master sensor node to the master sensor node. In operation 730, the slave sensor node performs operation in the sleep mode to consume the minimum power because the current power level of the internal battery is not sufficient to perform a normal function. For example, the sleep mode denotes a status in which operation consuming only as much power as required to switch to the active mode in response to an external interrupt signal is performed.

The slave sensor node charges the internal battery with power supplied from the master sensor node in the sleep mode. In other words, the slave sensor node performs wireless charging by the master sensor node. Also, the slave sensor node reports the previously checked power level of the internal battery to the master sensor node in operation 740. However, the power level of the internal battery may be reported by the slave sensor node to the master sensor node before the charge request message is transmitted.

Meanwhile, in operation 732, the slave sensor node determines whether there is data to be transmitted to the master sensor node. The slave sensor node performs operation 734 when there is data to be transmitted, and operation 736 when there is no data to be transmitted.

In operation 734, the slave sensor node transmits a charge request message together with the data to be transmitted to the master sensor node. At this time, the data and the charge request message may be transmitted to the master sensor node by one message or different messages. On the other hand, in operation 736, the slave sensor node transmits the charge request message to the master sensor node.

After transmitting the charge request message to the master sensor node, the slave sensor node charges the internal battery with power supplied from the master sensor node in the active mode in operation 738. In other words, the slave sensor node performs wireless charging by the master sensor node. Also, the slave sensor node reports the previously checked power level of the internal battery to the master sensor node in operation 740. However, the power level of the internal battery may be reported by the slave sensor node to the master sensor node before the charge request message is transmitted.

As described above, the slave sensor node charges the internal battery with power supplied from the master sensor node only when the power level of the internal battery corresponds to the need status or the emergency status, and performs general operation in the active mode without charging the internal battery in the full status or the normal status.

Meanwhile, although not shown in FIG. 7, the slave sensor node can switch to the active mode when the power level of the internal battery is varied by wireless charging while the slave sensor node is operating in the sleep mode because the power level corresponds to the emergency status. In other words, when it is checked that the power level of the internal battery corresponds to the normal status or the full status by internal battery power level check periodically performed in the sleep mode, the slave sensor node performs general operation in the active mode in operation 726. Otherwise, when an interrupt signal requesting mode switching is received from the master sensor node, the slave sensor node can switch to the active mode and perform general operation in the active mode. At this time, wireless charging that has been performed is stopped.

FIG. 8 illustrates a control flow for a master sensor node to charge an internal battery of a slave sensor node in a sensor network according to an exemplary embodiment of the present invention.

Referring to FIG. 8, when a master sensor node is powered on in operation 810, the master sensor node transmits power for wireless charging together with a beacon message in operation 812. From the viewpoint of the master sensor node, the beacon message is transmitted for active scan. On the contrary, from the viewpoint of a slave sensor node, the beacon message is transmitted for passive scan.

In operation 814, the master sensor node watches whether a beacon request message is received from a slave sensor node. In other words, the master sensor node watches reception of a beacon request message transmitted for active scan by the slave sensor node in operation 814.

When a beacon request message is received, the master sensor node performs operation 812 to supply power for wireless charging together with the beacon message. From the viewpoint of the slave sensor node, the beacon message is transmitted for active scan.

Regardless of passive scan or active scan, the beacon message transmitted by the master sensor node includes a wireless resource use plan, that is, the definition of active/inactive periods and information on the master sensor node.

After recognizing at least one slave sensor node that can be associated with the master sensor node itself by transmission of the beacon message, the master sensor node watches whether an association request message is received from the previously recognized slave sensor node. The association request message from the slave sensor node requests association with the master sensor node. Also, the association request message includes an hourly chargeable electric energy rate estimated by the slave sensor node.

When the association request message is received from the slave sensor node, the master sensor node generates an energy table in operation 818, and performs an association process with the slave sensor node that has transmitted the association request message. The association process corresponds to a general process in a sensor network and thus will not be described in detail.

Meanwhile, information managed in the energy table generated by the master sensor node becomes a criterion for determining when wireless charging will be attempted for which slave sensor node.

When the master sensor node is associated with the slave sensor node that has requested association, the master sensor node performs data exchange in operation 820. At this time, a charge request message can be provided together with data by the slave sensor node. When there is no data to be received from the slave sensor node or to be transmitted to the slave sensor node, operation 820 may be omitted. However, even if data exchange is omitted, the charge request message transmitted by the slave sensor node from necessity is received.

In operation 820, the master sensor node can receive not only data but also the power level of an internal battery periodically reported by the slave sensor node. When there is no data to be exchanged, only the power level of the internal battery can be provided by the slave sensor node. In operation 822, the master sensor node updates information managed by the generated energy table with the power level reported by the slave sensor node.

In operation 824, the master sensor node determines whether a charge request message is received or has been received from the slave sensor node. In other words, it is determined whether a charge request message is received from the slave sensor node when data is exchanged, or whether a charge request message is received from the slave sensor node regardless of data exchange.

When it is determined that a charge request message is received from the slave sensor node, the master sensor node supplies power for wireless charging of the internal battery of the slave sensor node in operation 826. At this time, although not clearly shown in the drawing, power supply for wireless charging can be performed together with data exchange.

However, when a charge request message is not received from the slave sensor node, the master sensor node checks a status corresponding to the previously reported power level in operation 828. In other words, the master sensor node determines which one of the emergency status, the need status, the normal status and the full status the previously reported power level of the slave sensor node corresponds to.

When it is determined that the power level of the internal battery of the slave sensor node corresponds to the emergency status or the need status, the master sensor node performs operation 820. On the other hand, when it is determined that the power level of the internal battery of the slave sensor node corresponds to the normal status or the full status, the master sensor node performs operation 830.

When it is determined that the power level of the internal battery of the slave sensor node corresponds to the emergency status or the need status, the master sensor node performs operation 820 because wireless charging has already begun being performed by the charge request message. However, when it is determined that the power level of the internal battery of the slave sensor node corresponds to the normal status or the full status, the master sensor node performs operation 830 to determine whether the internal battery of the slave sensor node is sufficiently charged by wireless charging.

In operation 830, the master sensor node determines whether the power level of the internal battery of the slave sensor node is changed. The determination can be made on the basis of the previously generated or updated energy table. Here, no change of the power level implies that wireless charging has not been previously performed. On the other hand, a change of the power level implies that wireless charging has been previously performed.

Thus, when it is determined that the power level is not changed, the master sensor node performs operation 820. On the other hand, when it is determined that the power level is changed, the master sensor node performs operation 832.

In operation 832, the master sensor node transmits a wake-up message requesting the slave sensor node, which is in the sleep mode, to switch to the active mode to the slave sensor node. In operation 834, the master sensor node determines that the slave sensor node does not need to be charged and stops ongoing wireless charging.

FIG. 8 illustrates an example in which operations dependent on a charge request message and a status corresponding to a reported power level are separately implemented. However, when a reported power level corresponds to the emergency status or the need status, a charge request message may be considered to be received. Also, FIG. 8 is illustrated as if the power level or the charge request message of the slave sensor node were received only when data was exchanged. However, needless to say, the power level can be periodically reported or the charge request message can be received from the slave sensor node regardless of data exchange.

Also, in the description of FIGS. 7 and 8, switching from the sleep mode to the active mode is not taken into consideration when the power level of the slave sensor node is changed from the emergency status to the need status. However, when the power level of the slave sensor node is changed from the emergency status to the need status, the slave sensor node can switch from the sleep mode to the active mode.

FIG. 9 shows an example of an energy table managed by a master sensor node according to an exemplary embodiment of the present invention.

Referring to FIG. 9, an energy table manages an 8-bit slave sensor node address Slave Node Address, a 3-bit power level Energy Level, a 2-bit status Status, 1-bit information about whether or not the corresponding slave sensor node is charged IsCharge, 2-bit reserved information, and an 8-bit hourly chargeable electric energy Charge Power/Sec.

The 8-bit slave sensor node address Slave Node Address is address information for identifying a slave sensor node. The 3-bit power level Energy Level is the power level of an internal battery corresponding to the slave sensor node. For example, the full status is defined as "011," the normal status is defined as "010," the need status is defined as "001," the emergency status is defined as "000," and a case in which it is impossible to know the power level is defined as "100."

The 2-bit status Status is information for identifying the current operation status of the slave sensor node. For example, "00" denotes the active mode in which the slave sensor node is associated with a master sensor node, "01" denotes a situation in which the slave sensor node is powered off, and "10" denotes the sleep mode in which the slave sensor node consumes the minimum power. Also, "11" denotes a situation in which a logical connection with the slave sensor node is completely cut off.

The 1-bit information about whether or not the corresponding slave sensor node is charged IsCharge denotes whether or not the slave sensor node is being charged. For example, "1" is recorded when the slave sensor node is currently being charged, and "0" is recorded when the slave sensor node is not being charged.

The 2-bit reserved information Reserved is designated to be used in case of need, and the 8-bit hourly chargeable electric energy Charge Power/Sec is a field for recording an hourly chargeable electric energy rate estimated and reported by the slave sensor node.

FIGS. 10 to 13 show tables in which messages transmitted between a master sensor node and a slave sensor node for wireless charging are defined according to exemplary embodiments of the present invention.

FIG. 10 shows an example of a beacon message transmitted for a scan process by a master sensor node according to an exemplary embodiment of the present invention, and FIG. 11 shows an example of a message that can be transmitted by a slave sensor node according to an exemplary embodiment of the present invention.

FIG. 12 shows an example of information recorded in a command frame identifier field constituting the message of FIG. 11 according to an exemplary embodiment of the present invention.

FIG. 13 shows an example of information recorded in a capability information field constituting the message of FIG. 11 according to an exemplary embodiment of the present invention.

For example, when a slave sensor node transmits an association request message, the slave sensor node records "0x01" indicating an association request message in the command frame identifier field of the message format shown in FIG. 11. And, one of "11," "10," "01," and "00" corresponding to a power level is recorded in the capability information field constituting the message of FIG. 11. The power level recorded in the capability information field has been defined above, and the description will not be reiterated.

Meanwhile, when the slave sensor node transmits a charge request message, the slave sensor node records "0x10" indicating an association request message in the command frame identifier field of the message format shown in FIG. 11. And, the slave sensor node records "00" in the capability information field constituting the message of FIG. 11.

As described above, an exemplary embodiment of the present invention can reduce the number of times of wireless transmission at a cluster head sensor node by efficiently processing the same data that is transferred to the cluster head sensor node through multiple paths in a wireless sensor network configured by cluster topology. Thus, it is possible to reduce waste of energy at the cluster head sensor node and also extend the life of the cluster head sensor node.

Various other effects have been directly or indirectly disclosed in the detailed description above.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for at least one slave sensor node to charge an internal battery in a sensor network including a master sensor node and the at least one slave sensor node associated with the master sensor node, the method comprising:

estimating an hourly chargeable electric energy rate in a scan phase with the master sensor node;

after recognizing the master sensor node, transmitting the estimated hourly chargeable electric energy rate using an association request message requesting association with the master sensor node;

when a power level of the internal battery requires charging, requesting charging from the master sensor node and performing wireless charging;

during the wireless charging, reporting the power level of the internal battery varied by the wireless charging to the master sensor node by predetermined time periods; and when the power level reported to the master sensor node reaches a predetermined power level, stopping the wireless charging.

2. The method of claim 1, wherein the power level of the internal battery is classified as a full status, a normal status, a need status, or an emergency status, and when the power level of the internal battery corresponds to the need status or the emergency status, it is determined that charging is needed.

3. The method of claim 2, wherein the predetermined power level corresponds to one of the full status and the normal status.

4. The method of claim 3, wherein when the power level of the internal battery corresponds to the need status, the wireless charging is performed during data communication with the master sensor node, and when the power level of the internal battery corresponds to the emergency status, the wireless charging is performed in a standby mode consuming a minimum power.

5. A method for a master sensor node to charge an internal battery of at least one slave sensor node in a sensor network including the master sensor node and the at least one slave sensor node associated with the master sensor node, the method comprising:

after recognizing at least one slave sensor node in a scan phase, receiving an association request message including an estimated hourly chargeable electric energy rate from the slave sensor node;

generating an energy table on the basis of the hourly chargeable electric energy rate reported from the slave sensor node;

when a charge request is received from the slave sensor node, performing wireless charging on the slave sensor node on the basis of the generated energy table;

receiving a power level of the internal battery varied by the wireless charging from the slave sensor node on which the wireless charging is performed by predetermined time periods, and updating the energy table; and when it is determined that the power level reported from the slave sensor node on which the wireless charging is performed reaches a predetermined power level, stopping the wireless charging.

6. The method of claim 5, wherein the power level of the internal battery is classified as a full status, a normal status, a need status, or an emergency status, and when the power level of the internal battery corresponds to the need status or the emergency status, charging is requested.

7. The method of claim 6, wherein the predetermined power level corresponds to one of the full status and the normal status.

8. A slave sensor node charging an internal battery in a sensor network including a master sensor node and at least one slave sensor node associated with the master sensor node, the slave sensor node comprising:

a wireless charging receiving module for estimating an hourly chargeable electric energy rate in a scan phase with the master sensor node, and performing wireless charging by the master sensor node when a power level of the internal battery requires charging; and a transceiver for transmitting the estimated hourly chargeable electric energy rate using an association request message requesting association with the master sensor node after recognizing the master sensor node, requesting charging from the master sensor node when the power level of the internal battery requires charging, reporting the power level of the internal battery varied by the wireless charging to the master sensor node by predetermined time periods during the wireless charging, and stopping the wireless charging when the varied power level reaches a predetermined power level.

9. The slave sensor node of claim 8, wherein the power level of the internal battery is classified as a full status, a normal status, a need status, or an emergency status, and when the power level of the internal battery corresponds to the need status or the emergency status, it is determined that charging is needed.

10. The slave sensor node of claim 9, wherein the predetermined power level corresponds to one of the full status and the normal status.

11. The slave sensor node of claim 10, wherein when the power level of the internal battery corresponds to the need status, the wireless charging is performed during data communication with the master sensor node, and when the power level of the internal battery corresponds to the emergency status, the wireless charging is performed in a standby mode consuming a minimum power.

12. A master sensor node for charging an internal battery of at least one slave sensor node associated with the master sensor node in a sensor network including the master sensor node and the at least one slave sensor node, the master sensor node comprising:

a controller for receiving an association request message including an estimated hourly chargeable electric energy rate from at least one slave sensor node after recognizing the slave sensor node in a scan phase, generating an energy table on the basis of the hourly chargeable electric energy rate reported from the slave sensor node, and receiving a power level of the internal battery varied by wireless charging from the slave sensor node on which the wireless charging is performed by predetermined time periods to update the energy table;

a wireless charging transmitting module for supplying power for wireless charging of the slave sensor node on the basis of the generated energy table in response to each of the scan phase, data transmission to the slave sensor node, and reception of a charge request from the slave sensor node; and a wake-up radio frequency (RF) unit for transmitting an activation request message to the slave sensor node on which the wireless charging is performed when it is determined that the power level reported from the slave sensor node on which the wireless charging is performed reaches a predetermined power level.

13. The master sensor node of claim 12, wherein the power level of the internal battery is classified as a full status, a normal status, a need status, or an emergency status, and when the power level of the internal battery corresponds to the need status or the emergency status, the charge request is received.

14. The master sensor node of claim 13, wherein the predetermined power level corresponds to one of the full status and the normal status.

* * * * *